May 6, 1930.  H. A. DREFFEIN  1,757,707
HEATING FURNACE
Filed March 30, 1928  3 Sheets-Sheet 1
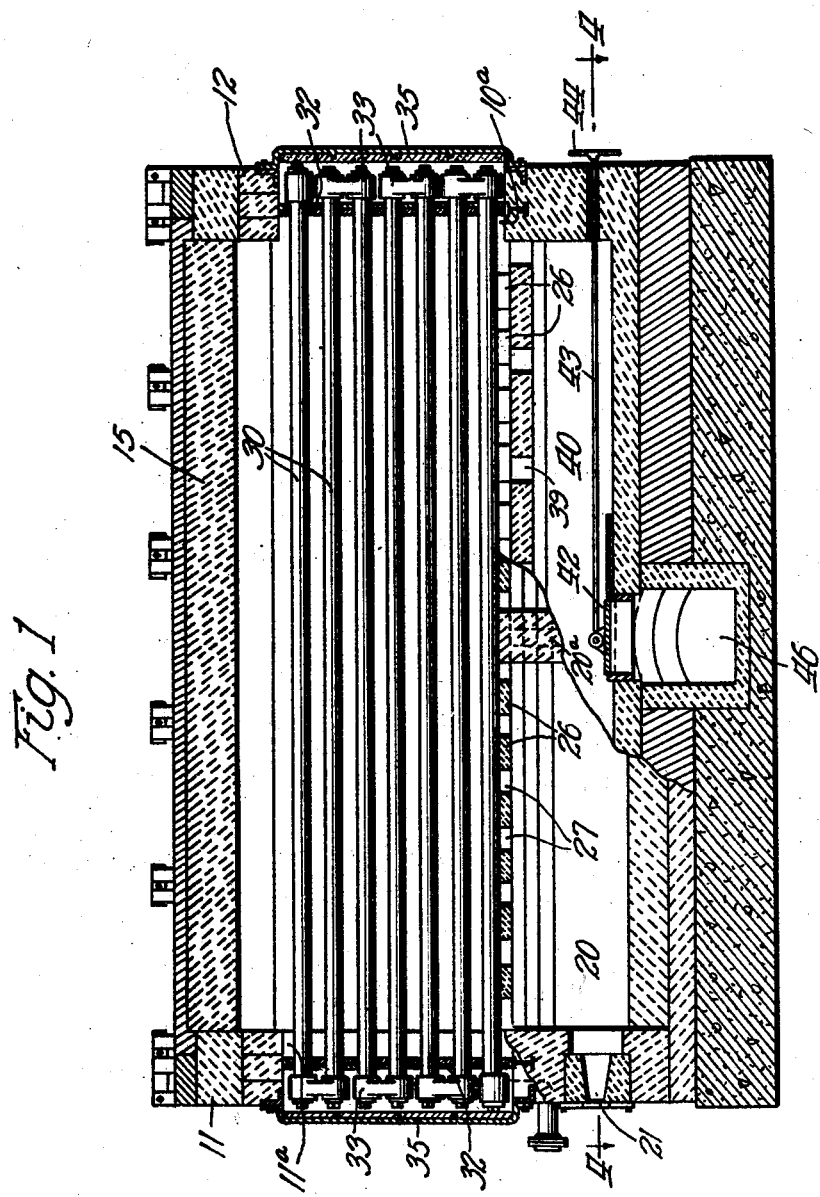
Inventor
Henry A. Dreffein May 6, 1930. H. A. DREFFEIN 1,757,707
HEATING FURNACE
Filed March 30, 1928  3 Sheets-Sheet 2

Inventor
Henry A. Dreffein

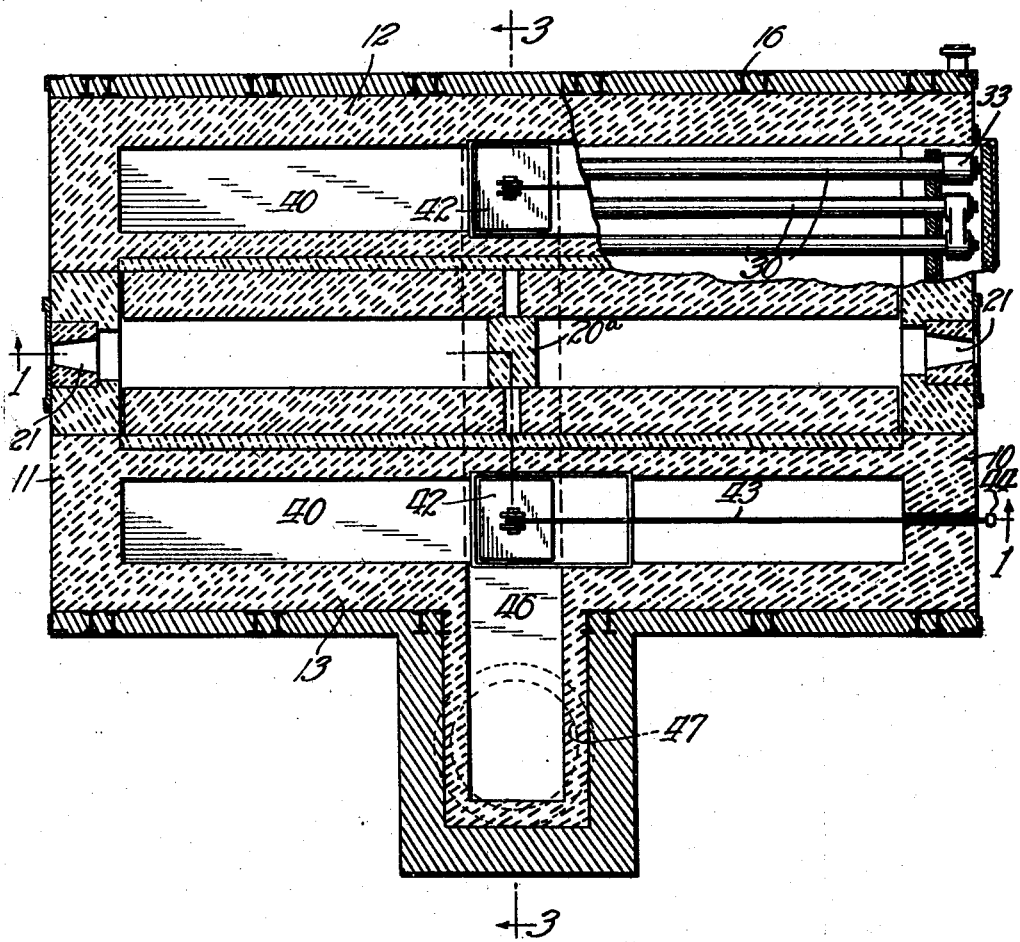

Patented May 6, 1930

1,757,707

UNITED STATES PATENT OFFICE

HENRY A. DREFFEIN, OF CHICAGO, ILLINOIS

HEATING FURNACE

Application filed March 30, 1928. Serial No. 266,086.

This invention relates to improvements in heating furnaces and has for an object to provide a furnace particularly adapted for the heating of viscid materials such as asphaltum, tar, thick oils and the like where the degree of their fluidity depends largely upon the temperature.

It has been found in practice that pipes through which such materials flow during the heating when subjected to high external temperatures by direct contact with heating gases or the like, become coated or internally caked with the material in coked condition and this coating frequently results in obstructing the flow of heat through the pipe to the fluid content and the pipes become overheated and break down or sag causing shut downs and fires, as well as damaging the furnaces themselves.

With a furnace embodying my invention, the heating gases of combustion when delivered into the furnace chamber do not directly contact with the pipes but flow adjacent thereto during which flow radiant heat is transmitted to the pipes serving to reduce the temperature of the heating gases which are then passed around the pipes to be partly discharged through the exhaust ports and partly re-circulated with the incoming gases, this admixture of partially cooled gas with the incoming gas at maximum temperature serving to partially reduce the temperature of the latter so that a more uniform temperature prevails throughout the furnace chamber.

Another object resides in the process of heating viscid materials or the like which may be effectively practiced in the apparatus embodied in my invention.

Other objects will be apparent from a reading of the following specification. In the accompanying drawings I have illustrated one embodiment of my apparatus, in which drawings:

Fig. 1 is a vertical longitudinal section along the regular section line 1—1 of Fig. 4;

Fig. 4 is a horizontal section along the line 4—4 of Fig. 1.

Figure 3:
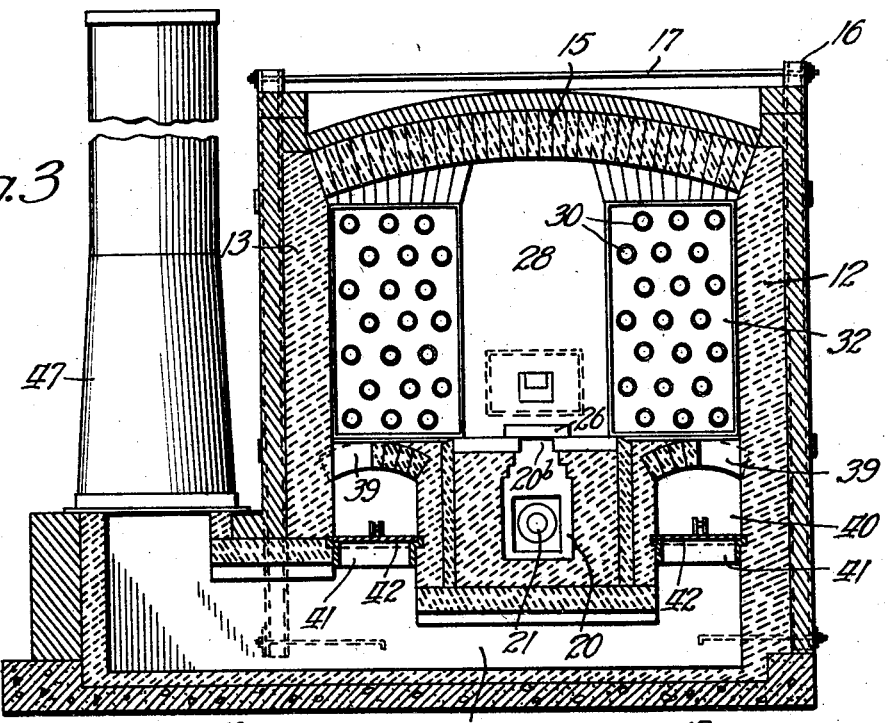
Fig. 3 is a vertical section along the line 3—3 of Fig. 4.

Like numerals refer to like elements throughout the drawings, in which is illustrated a furnace having the end walls 10, 11, the side walls 12, 13 and the roof 15 all constructed of suitable refractory material held together by buckstays 16, tie rods 17 and the like. The roof 15 is preferably arched, as shown in Fig. 3, for example.

In the bottom of the furnace is provided a heating tunnel 20 divided into two portions by the intermediate or centrally disposed partition 20$^a$. A burner opening or nozzle 21 is provided in each end wall at the ends of tunnel 20 for the introduction of fuel, such as oil, gas, powdered coal or the like, although it will be understood that any suitable heating fuel may be utilized and the structure modified to accommodate the use of such fuel.

Figure 2:
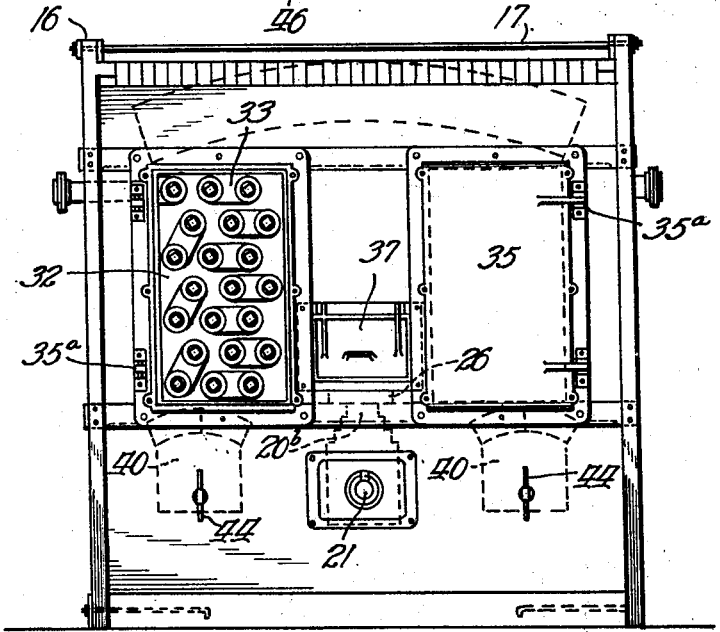
Fig. 2 is an end elevation of the same, one of the clean-out doors being shown as removed.

Combustion to a greater or less extent takes place in the tunnel 20 and an outlet 20$^b$ is provided therefrom in the floor of the heating chamber of the furnace as illustrated in Fig. 3, for example. Refractory blocks or tile 26 are placed at intervals across the opening 20$^b$ to provide ports 27 for the heating gases from the tunnel 20. By shifting or varying the size of these blocks or tile 26 the size or number of the ports 27 may be varied to produce the heating effect desired at different points in the furnace. Above the outlet 20$^b$ the furnace chamber is provided with a clear space 28, at each side of which are courses of pipe 30 arranged in groups, each group in the form illustrated comprising a continuous conduit for the material to be heated. The end walls are provided with cut-out portions 10$^a$, 11$^a$ and in each of these openings, of which there are two at each end in the form illustrated, is located a built-up plate 32 illustrated as formed of sections or units as shown in Fig. 3, for example, suitably apertured for the passage of the ends of each run of pipe 30, the runs being connected by headers 33 located outwardly of the plates 32. A clean-out door or cover plate 35 is mounted to cover the header ends of the pipes at each end of the furnace, these doors 35 being hinged at 35$^a$ (see Fig. 2) for ready access to the pipe ends for cleaning, inspection or the like.

At each end of the furnace is also provided a hinged or sliding door 37 communicating with the clear space 28 just above the floor level for ready access to the interior of the furnace for adjustment, replacement or removal of the blocks 26.

At each side of the furnace beneath the groups of pipes and in the floor of the heating chamber is provided a plurality of outlet ports 39. Beneath each set of these ports is located an exhaust tunnel 40. At its central portion each tunnel 40, in the floor thereof, is provided with a discharge opening 41 with which co-acts a sliding gate or damper 42, operable by the rod 43 and handle 44; the latter being located externally of the furnace. A cross duct 46 is located at the bottom of the furnace and leads to the discharge stack 47 being arranged for communication of the outlet tunnels 40 through the openings 41, the size of which, as indicated above, are regulable by the gates or dampers 42. In the practice of my process, with the structure illustrated, fuel is supplied through the nozzle 21 and burned in the heating tunnel 20 in both portions thereof. The gases of combustion being under pressure flow upwardly at substantial velocity through the outlet 20$^b$ into space 28 rising toward the roof 15 of the furnace under pressure and also actuated by the natural tendency of the heated gases to rise. During this flow the gases are substantially out of contact with the pipes 30, but transmit radiant heat thereto which transmission and the absorption thereof by the pipes and the material in the pipes lowers the temperature of such gases. As the gases rise in the space 28 they expand. The delivery of such gases through the ports 20$^b$ being at substantial velocity sets up an inductive effect at the lower portion of the furnace and this in conjunction with the tendency of the cooler gases at the top of the furnace to fall, sets up a species of circulatory action. The outlets 39 being located at or near the bottom of the furnace and adjacent the sides thereof, contribute to the downward movement of the circulating gases and permit the exhaust of a portion of the gases of combustion, the remainder being re-circulated into admixture with the incoming gases. The arched roof 15 may assist in the deflection of the gases toward the pipes. The gates or dampers 42 are adjusted to obtain the desired discharge of gases and, as stated, that portion thereof in excess of the capacity of the outlet openings 41 is induced or moved transversely of the heating chamber adjacent the bottom thereof to admix with the incoming gases of combustion. Being at a relatively lowered temperature, the re-circulated gases in mixing with the incoming fresh gases also assist in lowering the temperature of the latter so that the relatively high maximum temperature of the incoming gases is reduced to a proper point by admixture with the re-circulated gases and by the transmission and absorption of the radiant heat described above. This results in the lowering of the temperature of the gases of combustion to the desired point before they are brought into direct contact in substantial quantity with the pipes, which contact commences with the down flow of the gases from the upper portion of the heating chamber.

It will be noted that a bank of tubes 30 is provided at each side of the wall space 28 and interposed between the incoming gases and the refractory walls. By this arrangement the radiant heat of the incoming gases impinges upon the tubes before it contacts with the masonry or refractory walls. In this manner the walls are subjected to a materially lesser heat and radiation losses are greatly cut down so that the economy and efficiency of operation are much greater than would otherwise be the case. At the same time the inner tubes of each bank are subjected to radiant heat alone when the gases may be at their highest and most destructive temperature and this not only partially reduces this temperature, but effects a saving of the heat units in a desirable manner.

The operation permits the use of heating gases at a higher initial temperature and subjects the pipes and their contents to a more uniform temperature throughout the heating chamber, so that by proper control of such temperature the objectionable coking effect and subsequent destruction of the pipes is obviated. Also none of the pipes are subjected to a destructive concentrated contact of the incoming gases which are at maximum temperature.

The construction permits ready access to the header ends of the pipes for cleaning or replacement.

Any suitable connection with a source of materials to be heated may be made. As this forms no integral part of my present invention, I have not illustrated the same in detail.

It will be obvious that my invention may be modified and changed and I do not wish to be restricted to the form shown and described except as it may be limited thereto by dependent claims.

What I claim is:

1. A process of heating viscid materials, consisting in passing said materials through spaced runs of pipe in a heating chamber, introducing heating gases at one side of said pipes at substantial velocity and out of direct contact therewith, subjecting said pipes at said side to unobstructed radiated heat from said gases and thereafter changing the direction of flow of and circulating said gases around said pipes at the temperature as reduced by transmission of said radiated heat, whereby the tubes at said side will be subjected to the effect of substantially only radiant heat from the inflowing heating gases.

2. A process of heating viscid materials, consisting in passing said materials through spaced runs of pipe in a heating chamber, introducing heating gases at one side of said pipes at substantial velocity and out of direct contact therewith, subjecting said pipes at said side to unobstructed radiated heat from said gases and thereafter changing the direction of flow of and circulating said gases around said pipes at the temperature as reduced by transmission of said radiated heat, and re-circulating a portion of said gases after passage around said pipes with the incoming gases of combustion, whereby the tubes at said side will be subjected to the effect of substantially only radiant heat from the inflowing heating gases.

3. A heating furnace for viscid material having a heating chamber, circulating pipes in said chamber for the passage of said material, said pipes being spaced and arranged in a group in such wise as to provide a clear space in said chamber at one side of said group, and means to supply heating gases in a vertical direction to said space at substantial velocity, said pipes being exposed to the direct unobstructed, radiant heat of said gases, said furnace being further provided with an outlet in the lower portion thereof spaced from said supply means, whereby the pipes of said group adjacent said clear space will be subjected to the direct radiant heat of the inflowing gases without contact therewith, and whereby said gases will subsequently flow downwardly through said pipes for heating thereof by convection.

4. A heating furnace for viscid material, having a heating chamber, circulating pipes in said chamber for the passage of said material, said pipes being arranged in a group in spaced relation in such wise as to provide a clear space in said chamber and means to supply heating gases in a vertical direction, at substantial velocity to said space at or near the bottom of said chamber whereby said pipes adjacent said clear space will be subjected to the direct unobstructed radiant heat of the incoming gases supplied to said space without contact therewith, said furnace being further provided with an outlet for said gases spaced from said supplying means and so arranged with respect to said pipes as to cause circulation of said gases downwardly and around said pipes.

5. A heating furnace for viscid material having a heating chamber, spaced circulation pipes for said material arranged in one portion of said chamber; means to supply heating gases to said heating chamber in a vertical direction at one side of said pipes, at substantial velocity and out of direct immediate contact therewith, whereby said pipes adjacent the inflowing gases will be subjected to the direct radiant heat thereof without contact therewith, an outlet passage located beneath said pipes and ports communicating between said heating chamber and said passage, to effect redirection of said gases and a circulation thereof through said pipes to heat the same by convection.

6. A heating furnace for viscid material having a heating chamber, spaced circulation pipes for said material arranged in one portion of said chamber; means to supply heating gases to said heating chamber in a vertical direction at one side of said pipes at substantial velocity, and out of direct immediate contact therewith, whereby said pipes adjacent the inflowing gases will be subjected to the direct radiant heat thereof without contact therewith, an outlet passage located beneath said pipes and ports communicating between said heating chamber and said passage, said passage being provided with an outlet port, to effect a redirection of said gases and a circulation thereof through said pipes to heat the same by convection, and means to regulate the size of said port.

7. A heating furnace for viscid material having a heating chamber and a combustion chamber located therebeneath, said furnace being further provided with one or more ports providing communication between said combustion chamber and said heating chamber, pipes in said furnace chamber for the circulation of said material, said pipes being located in banks at each side of said combustion ports to form a clear chamber in alignment with said ports, whereby said pipes adjacent said clear chamber will be subjected to the direct radiant heat of said inflowing gases without contact therewith, said furnace being provided with an exhaust tunnel and one or more ports affording communication between said furnace chamber and said tunnel, said ports from said combustion chamber being arranged to supply heating gases thereto out of direct contact with the pipes adjacent to clear chamber, whereby said adjacent pipes will be subjected to the direct unobstructed radiant heat of said gases without contact therewith, said exhaust ports being located in such wise as to effect a redirection of said gases and circulation thereof through said pipes after passage through said clear chamber.

8. A heating furnace for viscid materials having a heating chamber, pipes for the circulation of said material, said pipes being arranged in groups one at each side of said heating chamber to provide a clear space between, means to supply heating gases at substantial velocity to said clear space out of direct immediate contact with said pipes, in a vertical direction, whereby the pipes adjacent said clear space will be subjected to the direct radiant heat of said inflowing gases without contact therewith, an exhaust tunnel and ports communicating between said heating chamber and said tunnel, said ports being so constructed and arranged as to effect a redirection of said gases and circulation thereof through said groups of pipes after passage of said gases through said clear space.

9. A heating furnace for viscid materials having a heating chamber, pipes for the circulation of said material, said pipes being arranged in groups one at each side of said heating chamber, to provide a clear space between, means to supply heating gases at substantial velocity to said clear space out of direct immediate contact with said pipes in a vertical direction, whereby the pipes adjacent said clear space will be subjected to the direct radiant heat of said inflowing gases without contact therewith, exhaust tunnels located one beneath each of said groups of pipes and ports communicating between said heating chamber and said tunnels, said ports being so constructed and arranged as to effect a redirection of said gases and circulation thereof through said groups of pipes after passage of said gases through said clear space, said furnace being provided with an exhaust passage communicating with said tunnels.

10. A heating furnace for viscid materials having a heating chamber, pipes for the circulation of said material, said pipes being arranged in groups one at each side of said heating chamber to provide a clear space between, means to supply heating gases at substantial velocity to said clear space out of direct immediate contact with said pipes, in a vertical direction, whereby the pipes adjacent said clear space will be subjected to the direct radiant heat of said inflowing gases without contact therewith, said furnace being provided with exhaust tunnels located one beneath each of said groups of pipes, and ports communicating between said heating chamber and said tunnels, said furnace being provided with an exhaust passage communicating with said tunnels, said ports being so constructed and arranged as to effect a redirection of said gases and circulation thereof through said groups of pipes after passage of said gases through said clear space, and means to regulate the amount of gases flowing from said tunnels into said passage.

11. A heating furnace for viscid material having a heating chamber, a group of spaced circulating pipes in said chamber for the passage of said material, said chamber being provided with a clear space at one side of said pipes, an inlet at or near the bottom of said chamber to supply heating gases to said space in a vertical direction at substantial velocity and out of direct contact with the pipes adjacent said space whereby said last named pipes will be subjected to the direct radiant heat of the incoming gases without contact therewith, an outlet at or near the bottom of said chamber adjacent said group of pipes and spaced from said inlet, said outlet being constructed and arranged to effect a redirection of said gases and circulation thereof through said pipes after passage through said clear space, and means to control the amount of gases discharged from said chamber through said outlet.

In testimony whereof, I have signed my name to this specification.

HENRY A. DREFFEIN.